July 14, 1959 H. W. BOYLAN ET AL 2,894,444
AIR OUTLET DEVICES

Filed Oct. 4, 1956 3 Sheets-Sheet 1

INVENTORS
Henry W. Boylan &
BY James E. Matt

J. W. Lovett
ATTORNEY

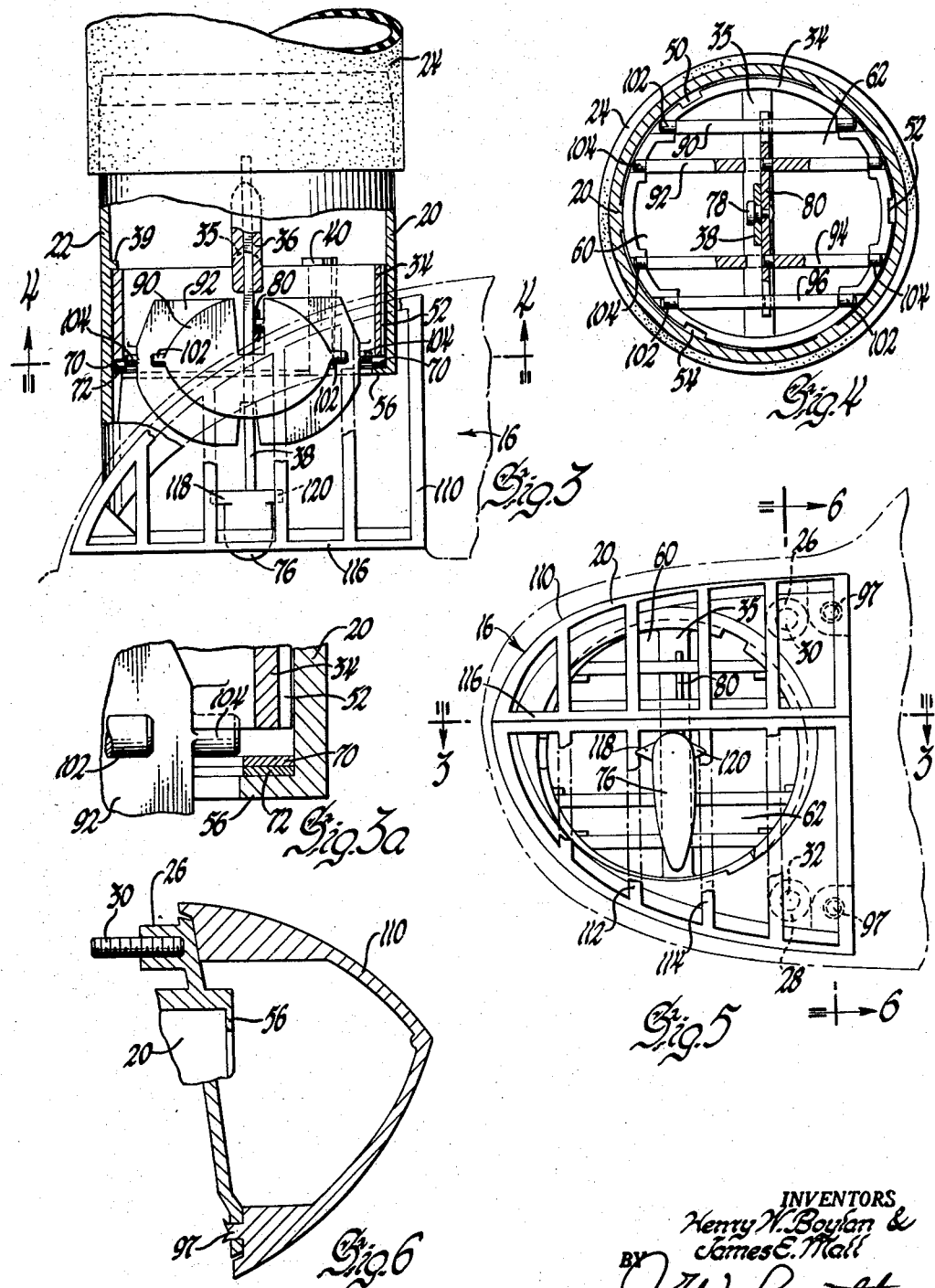

July 14, 1959     H. W. BOYLAN ET AL     2,894,444
AIR OUTLET DEVICES

Filed Oct. 4, 1956     3 Sheets—Sheet 3

INVENTORS
Henry W. Boylan &
BY James E. Matt

J. W. Lovett
ATTORNEY

United States Patent Office 2,894,444
Patented July 14, 1959

2,894,444
AIR OUTLET DEVICES

Henry W. Boylan and James E. Mall, Flint, Mich., assignors to General Motors Corporation, Detroit, Mich., a corporation of Delaware Application October 4, 1956, Serial No. 613,971

4 Claims. (Cl. 98—2)

This invention relates to air outlet devices and more particularly to outlet devices for discharging air in any of numerous selected directions and into an enclosure such as the passenger compartment of an automobile.

When a flow of air is to be directed into an automobile passenger compartment for heating, ventilating or cooling purposes, it is advisable to provide a convenient and effective means for adjusting the direction of flow of the air so that those persons being affected may be rendered as comfortable as possible with due regard to temperatures of the air being projected, the individual desires of those particular persons, and variations in clothing being worn. In order to make the device convenient to operate, it would be well to provide a single control element; and in the interest of economy and practicability it is desirable to emphasize simplicity and ruggedness of structure. An arrangement having openings at opposite ends of an instrument panel with vanes or louvers adjustable in one plane and located in the openings for directing air in selected directions is disclosed in the United States Patent 2,039,403, granted May 5, 1936, in the name of L. H. Gillette. Such a device or arrangement is operative and perhaps satisfactory to a certain extent, but it is now found that an arrangement more conducive to passenger comfort is provided if it will permit universal adjustment to discharge air in more than one plane.

An object of the present invention is to provide an improved air outlet device with a single control element for universally adjusting the angle of air discharge. Another object is to provide a universally adjustable air outlet device with a single control element in a combination which is simple and rugged in construction.

To these ends, a feature of the invention comprises a set of parallel vanes in the form of louvers with a single means for manually adjusting the angularity of the vanes in more than one plane. Another feature is an apertured air discharge member rotatably supported in a fixed frame and retaining parallel vanes adapted universally to deflect air upon manual adjustment.

These and other important features of the invention will now be described in detail in the specification and then pointed out more particularly in the appended claims.

In the drawings:

Fig. 3 is a plan view taken partially in section along the line 3—3 of Fig. 5;

Fig. 3a is a sectional view of a constructional detail shown in Fig. 3.

Fig. 4 is a sectional view of the outlet device shown in Fig 2 looking in the direction of the arrows 4—4;

Fig. 5 is an elevational view of an outlet device shown in Fig. 1 and is drawn to an enlarged scale;

Fig. 6 is a sectional view looking in the direction of the arrows 6—6 in Fig. 5;

Figure 1:
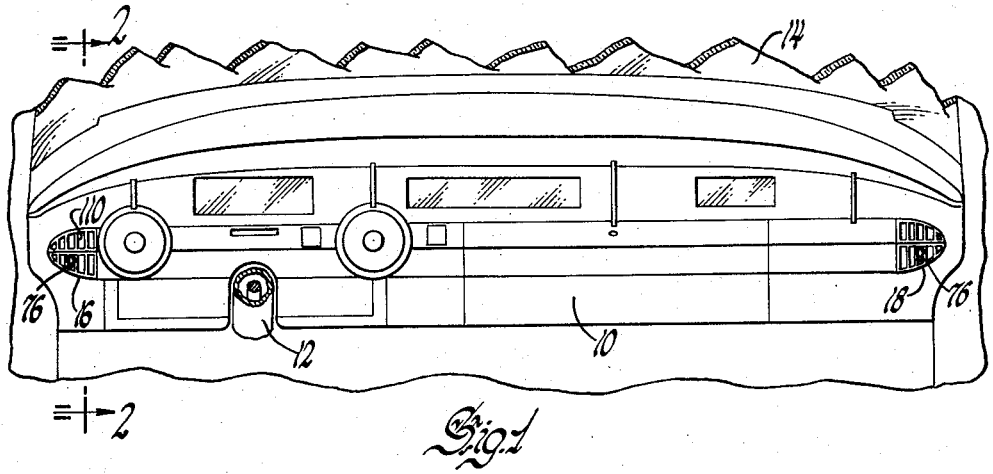
Fig. 1 is an elevational view of an instrument panel on an automotive vehicle in which panel two outlet devices incorporating the present invention are installed.
Figure 2:
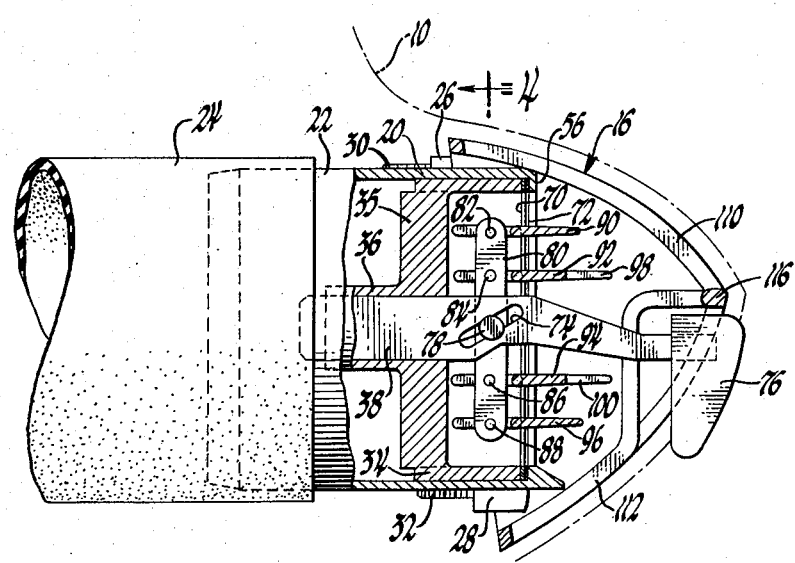
Fig. 2 is a sectional view drawn to an enlarged scale and taken through one of the outlet devices shown in Fig. 1 and as seen in the direction of the arrows 2—2.

The present invention may be used in stationary installations as well as on vehicles, but in the drawings it is shown as specifically adapted for use in an automobile. In Fig. 1 an instrument panel 10 is depicted with the conventional steering column 12 and windshield 14 as used on vehicles. At opposite ends of the panel 10 are installed two air outlet devices 16 and 18. As these devices are similar except for being to the opposite hand, only one or the left-hand outlet 16 is herein specifically described.

Figure 7:
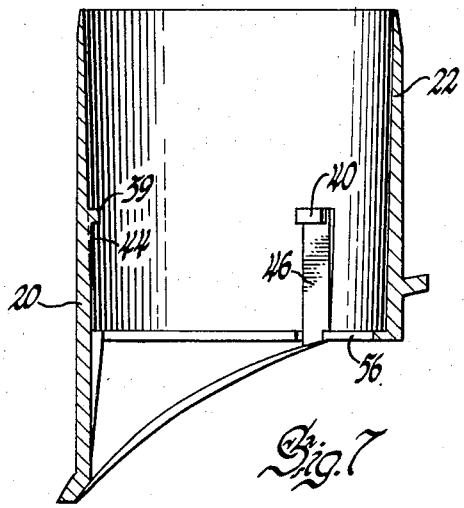
Fig. 7 is a sectional view through a frame used in the assembly of Figs. 2, 3 and 5.
Figure 8:
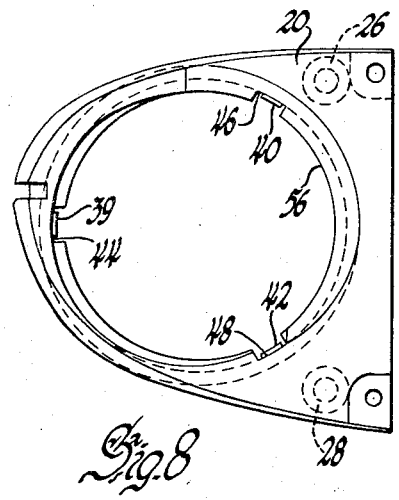
Fig. 8 is an elevational view of the frame shown in Fig. 7.

The outlet 16 includes a frame 20 having a rear cylindrical portion 22 adapted to be connected with a flexible conduit 24 leading to some source of air supply such as a blower, heater, evaporator or ventilating air conduit. The frame bears two lugs 26 and 28 which are integral therewith and which carry two studs 30 and 32 respectively. These studs are for the purpose of holding the frame 20 rigidly in place on the instrument panel 10. Other holding means may be provided if desired. The frame 20 is so formed as to enclose a rotative member 34 therein. This member is in the form of a cup with an open bottom traversed by a cross member 35. Integral with the member 35 is a protuberance 36 which is slotted to receive one end of a flat member 38. The inner wall of the frame 20 is provided with three stops or inwardly directed lugs 39, 40 and 42 equally spaced apart. Lands are formed on the inner wall of the frame 20 and one of these lands extends up to each of the three stops. These lands are provided with a constant radius surface and are seen in Figs. 7 and 8, at 44, 46 and 48. The cylindrical member 34 is of the proper diameter to engage and rotate within these three lands. The member 34 bears three slots 50, 52 and 54 to correspond with the three lugs 39, 40 and 42 in such a way as to permit assembly of the device, as will further appear.

The forward end of the frame 20 bears an inwardly directed annular lip 56 which has an inside diameter substantially the same as that of the cylindrical member 34. If desired, this lip may be notched, as shown, to aid in forming the lands 44, 46 and 48.

The rear end or bottom of the cup member 34 is apertured as at 60 and 62 on opposite sides of the cross member 35. This latter part has a somewhat elliptical cross section so that the apertures 60 and 62, together with the tubular portion 22, provide a smoothly contoured air passage extending through the entire device.

Interposed between the forward annular margin of the cylindrical member 34 and the flange 56 on the frame 20 are an annular washer 70 and an annular spring washer 72. With the cooperation of the stops such as stop 40, the washer 72 serves to prevent rattling of the assembly.

The flat member 38 bears an inclined slot 74 and its forward end is adapted to carry a knob 76 for manipulation by the operator. A rivet or pin 78 is utilized to serve as a cam follower for operative engagement with the parallel walls of the slot 74. This rivet is fixed to the intermediate portion of a vertical link 80 bearing spaced apertures 82, 84, 86 and 88. These apertures are adapted to receive pivots formed on four vanes 90, 92, 94 and 96. Slots are formed in the back ends of the vanes to accommodate movement and installation of the link 80. The forwardly directed edges of the vanes 92 and 94 are also slotted as at 98 and 100 to avoid interference with the forward end of the flat member 38, as will further appear.

Each of the vanes 90, 92, 94 and 96 is provided with oppositely directed trunnions such as 102 and 104. These trunnions are in one plane and are journaled in notches formed in the forward edge of the member 34, as best seen in Figs. 3, 3a and 4. It will be noted that the apertures 82, 84, 86 and 88 and lie in a second plane.

Fixed to the front end of the frame 20 partially to conceal the vanes 90, 92, 94 and 96 is an ornamental grille member 110. This member is attached to the frame 20 by two peened over projections 97, one of which is clearly shown in Fig. 6. The grille member is of such shape as pleasingly to conform with the contour of the panel 10. A forward end of the grille is recessed by forming two of the bars 112 and 114 into L-shaped portions intersecting the horizontal bar 116. The forward end of the flat member 38 extends between these two bars and the knob 76 bears two opposed projections 118 and 120 which are adapted to constitute stop members cooperating with the horizontal portions of the bars 112 and 114.

Some question may arise as to the manner of assembly of the device. It will be seen that the cylindrical member 34 is placed within the frame 20 from the rear. The member 34 is turned so its grooves 50, 52 and 54 correspond or come into alignment with the three projections 39, 40 and 42. When inserted into position within the assembly as shown in Fig. 3, and against the resistance of the spring washer 72, the member 34 is turned to bring its grooves 50, 52 and 54 out of alignment with the projections 39, 40 and 42.

In operating the device and assuming that air is being forced to the device by way of the conduit 24, the air may be discharged straight out from the device by positioning the parts, as shown in Figs. 2, 3, 4 and 5. In the event that the air is to be deflected upwardly the knob 76 may be pulled out the desired extent with the result that the link 80 will cause the vanes to rotate about their trunnions 102 and 104 to give the desired upward air flow direction. In Fig. 3 it may be clearly seen that the pivots connecting the link 80 are eccentric or out of alignment with the trunnions 102 and 104. The vanes may be directed downwardly by pushing the knob 76 in toward the grille. If the air is to be directed to one side or the other, then the knob 76 is turned in the proper direction with the result that the member 34 will rotate and carry the vanes along with it. From this it may be seen that the single knob 76 may be employed to direct the air upwardly or downwardly or to the right or left to achieve universal adjustment of the air discharge direction or the vanes effecting such direction.

We claim:

1. An air outlet device comprising a frame with a cylindrical wall defining an air passage, a cylindrical member contacting and coaxial with said wall and defining an aperture adapted to serve as a discharge opening for said air passage, a portion extending inwardly from said member and being provided with a slot, parallel vanes arranged across said aperture and journaled in said member, a link pivotally connected to each of said vanes, a flat element slidably mounted in said slot and extending through said aperture, and a pin and slot connection between said link and flat element whereby said vanes may be universally adjusted by manually actuating said flat element.

2. An air outlet device comprising, a frame, a cylindrical member rotatably supported in said frame and defining an air passage extending in the direction of the axis of rotation of said member, parallel and spaced vanes arranged transverse to said air passage and journaled in one plane on said member, a link spaced from said cylindrical member and pivotally connected to each of said vanes in a second plane parallel to said first plane, control means slideably mounted in said cylindrical member and retained in non-rotatable relation therewith, and a cam connection between said control means and said link whereby linear sliding movement of said control means in the direction of said axis effects pivoting of said vanes through said link and rotary movement of said control means rotates said cylindrical member and vanes as a unit with respect to said frame.

3. An air outlet device comprising a frame with a cylindrical member rotatably mounted therein and defining an aperture in the direction of the axis of rotation of said member, a portion of said cylindrical member extending into said aperture, a control means extending generally in said direction and slideably supported in said portion, said member and control means being in non-rotative relation, parallel vanes traversing said aperture and journaled in said member in one plane, a link pivotally connected to each of said vanes in a second plane, and a cam connection between said control means and said link whereby universal adjustment of said vanes may be effected by actuation of said control means.

4. An air outlet device as set forth in claim 3 having a grille extending across said aperture and supported by said frame, and said control means extending through said grille for access to an operator.

References Cited in the file of this patent
UNITED STATES PATENTS 2,196,174    Booth _____ Apr. 9, 1940

FOREIGN PATENTS 686,005    Great Britain _____ 1953